(12) United States Patent
Ummenhofer

(10) Patent No.: US 7,302,799 B2
(45) Date of Patent: Dec. 4, 2007

(54) DRIVE SYSTEM FOR A VEHICLE

(75) Inventor: Gerhard Ummenhofer, Bad Schussenried (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 26 days.

(21) Appl. No.: 11/293,735

(22) Filed: Dec. 2, 2005

(65) Prior Publication Data

US 2006/0117744 A1  Jun. 8, 2006

(30) Foreign Application Priority Data

Dec. 3, 2004 (DE) ............. 10 2004 059 820

(51) Int. Cl.
*F16D 31/02* (2006.01)
*H02P 9/04* (2006.01)
(52) U.S. Cl. .............. 60/468; 60/464; 290/40 C
(58) Field of Classification Search ......... 60/464, 60/468, 488, 494; 180/65.4; 290/40 B, 290/40 C
See application file for complete search history.

(56) References Cited

U.S. PATENT DOCUMENTS 6,453,668 B1 * 9/2002 Johnson ............... 60/468

* cited by examiner

*Primary Examiner*—Michael Leslie
(74) *Attorney, Agent, or Firm*—Flynn, Thiel, Boutell & Tanis, P.C.

(57) ABSTRACT

The invention proposes a drive system for a vehicle, in particular for a tracked vehicle, having a drive machine and at least one load, which is mechanically coupled to an output drive of the drive machine, at least one control means being associated with the at least one load and reducing a power consumption of the at least one load in a starting phase of the drive machine temporarily compared with a power consumption in an operating state of the load whilst maintaining the mechanical coupling. Such a drive system has an improved starting capability compared with known systems since the reduction in the power consumption of the load in the starting phase of the drive machine reduces the risk of the drive machine stalling. The drive system according to the invention is considered to be particularly advantageous in the case of hydraulic loads and generators.

13 Claims, 3 Drawing Sheets

DRIVE SYSTEM FOR A VEHICLE

FIELD OF THE INVENTION

The invention relates to a drive system for a vehicle, in particular for a tracked vehicle, having a drive machine and at least one load, which is mechanically coupled to an output drive of the drive machine.

BACKGROUND OF THE INVENTION

Such drive systems can be found in all conventional vehicles. All vehicles have, as loads, at least those components which are required for the movement of the vehicle, in particular the driven wheels of a vehicle. A further conventional load in vehicles is the alternator, by means of which electrical energy is provided for operating a vehicle power supply system with electrical loads. In particular in the sector of tracked vehicles, hydrostatic drives are also often used in which the drive machine is used in order to drive one or more hydraulic pumps which in turn make available, for hydraulic motors, the pressure required for the progressive movement of the relevant vehicle.

In many vehicles today, a large number of loads are connected to the drive machine such that they cannot be detached mechanically. A consequence of this, which is regarded as disadvantageous, is the fact that these loads, starting directly when the drive machine is started, have a power consumption which impairs the starting behavior of the drive machine. This can easily result, in particular in the case of the abovementioned tracked vehicles with a hydrostatic drive, in a power consumption of the loads, on starting, which exceeds the output of mechanical power by the drive machine and thus results in the drive machine stalling. The problem is also heightened if the loads are those which have an initial power consumption on starting which is higher than the power consumption during normal operation.

In order to be able to provide the required power in the starting phase, it is known to decouple loads mechanically from the output drive of the drive machine, for example by disengaging the clutch in the case of a passenger vehicle. However, this method is relatively complex in design and is not favorable in economic terms. Depending on the type of load, such a mechanical separation also represents a source of danger, for example when disengaging feed pumps of a hydraulic drive system. If the mechanical coupling in such a system fails and, as a result of this, the operating pressure in the closed drive circuit cannot be maintained, it is not, for example, easily possible to brake the hydraulic motor counter to a torque which is brought about externally and acts on the hydraulic motor.

SUMMARY OF THE INVENTION

One object of the invention is to provide a generic drive system for a vehicle which has an improved starting behavior compared with that of the prior art.

This is achieved according to the invention by a drive system for a vehicle, in particular for a tracked vehicle, having a drive machine and at least one load, which is mechanically coupled to an output drive of the drive machine, at least one control means being associated with the at least one load and reducing a power consumption of the at least one load in a starting phase of the drive machine temporarily compared with a power consumption in an operating state of the load whilst maintaining the mechanical coupling.

The design of the drive system according to the invention is expedient primarily when the loads are those which are not required in the starting phase or in the case of which a temporary interruption in the power supply does not present a problem. The control means for reducing the power consumption of the loads can, on the one hand, be designed such that they can switch the load between two states (an operating state and a starting state with a reduced power consumption compared with the operating state), or, on the other hand, designed such that they can influence the power consumption of the load in a flexible manner constantly or in a plurality of discrete stages. The reduction in the power consumption of the load during the starting phase can be both represented such that the load no longer has any power consumption at all and also designed such that the power consumption of the load is merely reduced and possibly a limited ability of the load to function is maintained.

The drive machine is preferably an internal combustion engine which is set in operation by means of a starter motor. The starting phase of the drive machine is to be understood as being a period of time which begins with the activation of the drive machine in the case of an internal combustion engine, i.e. with the transmission of torque from the starter motor to the output drive of the drive machine, and which ends if a drive power of the drive machine is available which is suitable for hazard-free starting and operation of the load. The duration of the starting phase may depend on various factors, and the end of the starting phase may be made to be dependent on various influencing variables. One possibility is for the duration of the starting phase to be fixedly prescribed and to be programmed into an electronic control device, for example. Another possibility is for operating variables of the drive machine and/or the loads to be sensed and for the end of the starting phase to be established as a function of these variables. It is also possible to recognize events occurring during the course of the starting phase by means of suitable detectors and to measure the end of the starting phase on the basis of these events. For example, the period of time in which a voltage is applied to the starter motor can be used as the starting phase.

Owing to the fact that the mechanical coupling between the load and the drive machine is maintained, it is not necessary to provide mechanical separation, for example by means of a clutch, which may be complex in technical terms depending on the type of load and its coupling to the drive machine. Instead, the power consumption of the load is reduced with the existing coupling. In the case of a load connected to a rotating output shaft of the drive machine, this is expressed in the fact that a countertorque, which acts on the output shaft in the starting phase of the load, is reduced compared with a countertorque in the operating state. The result is the fact that the output shaft reaches a high rotation speed more quickly, and the risk of stalling is reduced. If the rotation speed is sufficiently high in order to be able to achieve the additional power consumption of the load during the operating state, the load is changed over to its operating state by means of the associated control means.

One advantageous refinement of the drive system according to the invention provides for the load to be a hydraulic load, and for the control means to be a hydraulic actuating means, it being possible for the hydraulic load to be short-circuited by means of the hydraulic actuating means.

In this case, a hydraulic load is understood to mean a component of a hydraulic system which draws power in the form of mechanical power and preferably converts it into power of another form. In this case, for example, any form of hydraulic pumps is possible. According to the invention, such loads are used in tracked vehicles having a hydrostatic drive, in particular in a tracked vehicle for the shaping or maintenance of pistes. Suitable loads in such tracked vehicles are, in particular, feed pumps for the traction drive and for additional functions such as a coiler drive or a winch drive, a hydraulic fan drive for an internal combustion engine or working hydraulics for the purpose of adjusting a rear tool carrier or a front-side attachment region such as a rake blade or the like. The short-circuiting of the hydraulic load makes it possible for hydraulic fluid conveyed by said load to be directed directly from the output of the hydraulic load to its input without being guided through further components of the hydraulic system, with the result that the mechanical work taken by the hydraulic load can be low. For the operation of a hydrostatic drive with a closed circuit, a corresponding basic pressure or feed pressure is required during normal operation. This pressure is disconnected during the starting phase. The short circuit can be produced directly between an inlet and an outlet of the hydraulic load, with the result that pressure compensation sets in between the inlet and the outlet as long as no further components restrict this. In the context of the present invention, a short circuit is also understood to mean a direct connection in which pressure-dependent nonreturn valves or comparable hydraulic components, such as pressure reduction valves, pressure-limiting valves etc., are provided which prevent complete pressure compensation between the input and the output of the hydraulic load.

In one development of the invention, the load is a hydraulic pump, and a bypass line is provided, by means of which the pump output is connected to the pump input, the actuating means associated with the load comprising a valve, in particular an electrically actuated solenoid valve, by means of which the bypass line can be controlled.

The power consumption of a hydraulic pump is substantially dependent on how great the pressure difference is between the pump output side and the pump input side. By means of a bypass line, which connects the pump output to the pump input, identical pressure conditions or pressure conditions which are only slightly different from one another can be set at the pump input and the pump output, as long as no further hydraulic switching elements are provided in the bypass line. The small or nonexistent difference between the pressure at the pump input and at the pump output results in only a small amount of mechanical energy being required to operate the pump. The valve provided in the bypass line takes on the function of the actuating means, by means of which the power consumption of the load can be controlled. If the valve is open, the bypass line is active and the power consumption of the hydraulic pump is correspondingly low. If the valve is closed, then the bypass line is thus interrupted such that an excess pressure is set on the pump output side with an increasing conveying rate of the hydraulic pump, and this excess pressure increases the power consumption of the hydraulic pump. The control of the bypass line can be limited to opening the valve and closing the valve or else may allow, in addition, setting of a variable pressure-limiting effect or pressure-reducing effect. In addition to the control of the valve and thus the function of the bypass line by means of an electrical signal, control on a hydraulic or pneumatic basis is also expedient.

In one development of the invention, a preferably spring-loaded nonreturn valve is provided in the bypass line and ensures a minimum pressure on the pump output side.

The nonreturn valve is incorporated into the bypass line such that it only opens when a determined minimum pressure difference, in particular 2 to 3 bar, prevails between the pump input side and the pump output side. The pressure drop on the pump output side when the valve is open is thus limited. The minimum pressure maintained in this manner entails a plurality of advantages: firstly, it shortens the period of time which is required after the end of the starting phase in order to produce the operating pressure again on the pump output side. At the moment at which the valve in the bypass line is closed at the end of the starting phase, the pressure on the pump output side begins to rise, starting from the minimum pressure. Secondly, the minimum pressure ensures that the hydraulic fluid does not emerge completely from the hydraulic pump as a result of a low pressure on the pump input side and thus prevents the hydraulic pump from running dry, which is damaging. This is desired in particular in the case of open hydraulic systems in which the hydraulic pump is connected on the pump input side to a supply tank, which is not subjected to excess pressure and contains hydraulic fluid.

In one development of the invention, the bypass line and the actuating means are integrated in a housing of the hydraulic pump.

Such a hydraulic pump can be handled in a particularly simple manner with respect to assembly. It has a pump input connection and a pump output connection and, for example, an electrical connection possibility for controlling the actuating means. Since the bypass line and the actuating means do not require a large amount of space, such a hydraulic pump having an integrated bypass line and an integrated actuating means may be identical to a hydraulic pump without these additional components in terms of its dimensions. This makes it possible to modify such hydraulic pumps subsequently in a simple manner in drive systems which are designed for conventional hydraulic pumps.

In one particular refinement of the invention, the hydraulic pump is a feed pump, by means of which the operating pressure in a hydrostatic drive circuit of the drive system is maintained.

In the case of feed pumps it is not disadvantageous if they are out of operation for a short period of time during the operation or only produce a minimum pressure since nonreturn valves are generally provided on the supply line from the feed pump for the purpose of maintaining the operating pressure in the hydrostatic drive circuit. Owing to these nonreturn valves, the closed drive circuit is separated from a hydraulic fluid supply to such an extent that, in the event of a pressure drop in the supply as a result of the open bypass line there is no return flow of hydraulic fluid from the drive circuit to the supply and there is thus no associated pressure loss in the drive circuit. In the normal case, in any case a slight pressure drop in the hydrostatic drive circuit is to be expected during the starting phase of the drive machine. Furthermore, it is expedient in particular in the case of feed pumps to reduce the power consumption since they generally have a high pressure difference between the pump output side and the pump input side in the operating state.

In one development of the invention, the load is an electric generator, and the control means is designed to suppress the current generation by the generator in the starting phase of the drive machine.

The generator may be, for example, the generator of an alternator of the vehicle which is provided for the purpose of supplying electrical energy to the vehicle power supply system. Short-term operation of the loads, which are dependent on this vehicle power supply system, and of the starter motor of the drive machine without current produced by the electric generator does not represent any problems since the power supply can be realized by a battery for this short period of time. The generator may be coupled mechanically to the output drive of the drive machine, for example, via a belt drive. As long as the current generation is suppressed during the starting phase, the power consumption of the generator is restricted to its mechanical power loss, while a countertorque, which acts counter to the drive torque of the drive machine and is caused by the current generation of the generator, does not come to fruition.

In one development of the invention, the production of an exciter field in the generator can be suppressed by the control means, preferably by interrupting a field winding of the generator.

The absence of the exciter field results in a situation in which no voltage is induced in a stator winding of the generator and thus no part of the mechanical drive power is converted into electrical power. The field winding can be interrupted, for example, by means of a relay which is open during the starting phase of the drive system.

In one development of the invention, the control means is designed to suppress the electrical connection between the generator and a vehicle power supply system or a battery of the vehicle.

Although with such a design an electrical field is produced by the field winding of the generator and thus a voltage is induced in the stator winding, since this stator winding is disconnected from the vehicle power supply system or the battery of the vehicle, there is no conversion of the mechanical power into electrical power. The disconnection of the electrical connection between the generator, on the one hand, and the vehicle power supply system and the battery, on the other hand, can be achieved by a relay or a plurality of relays.

In one development of the invention, the control means comprises a time-delay means, which delays a control effect, which is intended to be brought about by a control signal, of the control means temporally with respect to an occurrence of the control signal.

The control signal is in this case preferably an electrical signal. The time-delay means may be, for example, a timing relay which provides a fixed or an adjustable delay between the occurrence of the control signal and switching of the relay. Owing to the time-delay means it is possible to bring about a temporal interval between the control effect and the control signal, which is particularly expedient when the control signal is triggered by the occurrence of a circumstance which is fixed in time during the course of the starting phase. It is thus possible, for example if the mechanical coupling between an output shaft of the drive machine and the starter motor defines the end of the starting phase, to set a situation in which, after isolation of the drive shaft and the starter motor, a few more seconds elapse before the loads are switched to their operating state and are thus changed over to a state of increased power consumption. Owing to such a safety delay, the risk of the drive machine stalling towards the end of the starting phase can be reduced further still. The time-delay means need not be in the form of an integral unit with the control means. It is likewise conceivable and included in this invention for a separate time-delay means or a correspondingly designed program of a control device to be used which results in the control signal being passed on with a time delay.

In one development of the invention, the drive system has at least two loads each having at least one control means, the control means being designed such that a control effect, which is in each case coupled to the occurrence of a control signal, is brought about at a different time interval from the occurrence of the control signal.

This is particularly expedient when the respective control means of the two loads are connected such that they respond to the same control signals. In such a case there is the risk that the simultaneous switching of the respectively associated loads to the respective operating state causes a steep rise in the amount of power required at the output drive of the drive machine, which cannot be provided by the drive machine. If the control means are designed, however, such that at least one of them brings about its control effect first at a time interval from the occurrence of the control signal, a time interval between the switching of the respectively associated loads to their respective operating state can be achieved. The technical implementation may take place, for example, by means of one or more timing relays or by means of a program of a control device. Such a design of the control means is particularly expedient in the case of loads which have a higher power consumption during a starting operation than in an operating state. On the basis of such a load, it is possible to achieve a situation in which the operating state having a reduced power consumption compared to the starting operation is reached before another load is started.

In one development of the invention, the control means is connected directly to a starter of the vehicle and is designed such that it brings about a control effect for the duration for which a starter current is applied.

Such an implementation is particularly simple in technical terms. The starter current, which causes the starter motor to be supplied with electrical power directly or indirectly via a magnet switch or a relay, is supplied to the control means of the load by means of corresponding control lines. This is an expedient solution in particular if the control means can be switched electrically, for example are electrically switchable solenoid valves. This makes it possible for the load to remain in a state of reduced power consumption for the time span for which the driver depresses a starting button of the vehicle or holds an ignition key in a starting position. If the starting button is released once the speed brought about by the starter motor has been exceeded or the starting position is left by the key having been rotated back, at the same time the situation is achieved in which the load changes over to its operating state and operates in accordance with its normal mode of operation.

In one development of the invention, the drive system has a starter motor, which is operatively connected to the output drive of the drive machine in a mechanically detachable manner, and a sensor for the purpose of determining the coupling state of the starter motor and the output drive, a control line being provided between the sensor and the control means.

In such a drive system, the starting phase accordingly lasts until the coupling between the starter motor and the output drive has been disconnected. This is particularly expedient when the disconnection is determined by mechanical influencing factors, in particular the speed of the output drive. The disconnection of the starter motor and the output drive is a reliable indication that the drive machine is running of its own accord.

In one development of the invention, the control means are connected to a speed sensor coupled to the output drive of the drive machine and are designed such that a control effect is brought about as a function of a determined speed.

This is an expedient refinement since the power of the drive machine is generally directly linked to its speed. It is therefore possible to draw conclusions from the speed on the power of the drive machine such that—assuming an expediently set speed threshold—a sufficient driving power is available in order to be able to allow the power consumption of the load. This design may be realized, for example, by an electronic control device or a relay circuit or transistor circuit.

In one development of the invention, the control means is connected to an electronic control device which controls the control means as a function of driving parameters, parameters of the hydraulic drive system and/or environmental parameters.

Such an electronic control device makes it possible for a large number of parameters to be included in order to estimate an ideal point in time for changing the load over to its operating state. The parameters may in this case be, for example, a speed of the output drive of the drive machine, an oil temperature, an oil viscosity and/or an oil pressure in a hydraulic drive system, an ambient pressure and an ambient temperature. Furthermore, it is possible in a simple manner by means of an electronic control device to switch a plurality of loads with respectively associated control means over to their operating state such that they are temporally offset with respect to one another and such that a sudden and sharp increase in the power consumption of the loads is prevented. The control device is preferably designed such that it controls the entire starting operation of the vehicle, i.e. the mechanical coupling of the starter motor to the output shaft of the drive machine, the power supply of the starter motor, the disconnection of the starter motor and the output shaft and the control means of all of the loads.

These and further features of preferred developments of the invention are described in the claims and also in the description and drawings, in which the individual features may in each case be implemented alone or combined, in particular in the form of sub-combinations, and may represent advantageous embodiments which can be protected per se and for which protection is claimed here.

BRIEF DESCRIPTION OF THE DRAWINGS

Exemplary embodiments of the invention are illustrated schematically in the drawings and will be explained in more detail below. In the drawings.

DETAILED DESCRIPTION OF THE INVENTION

Figure 1:
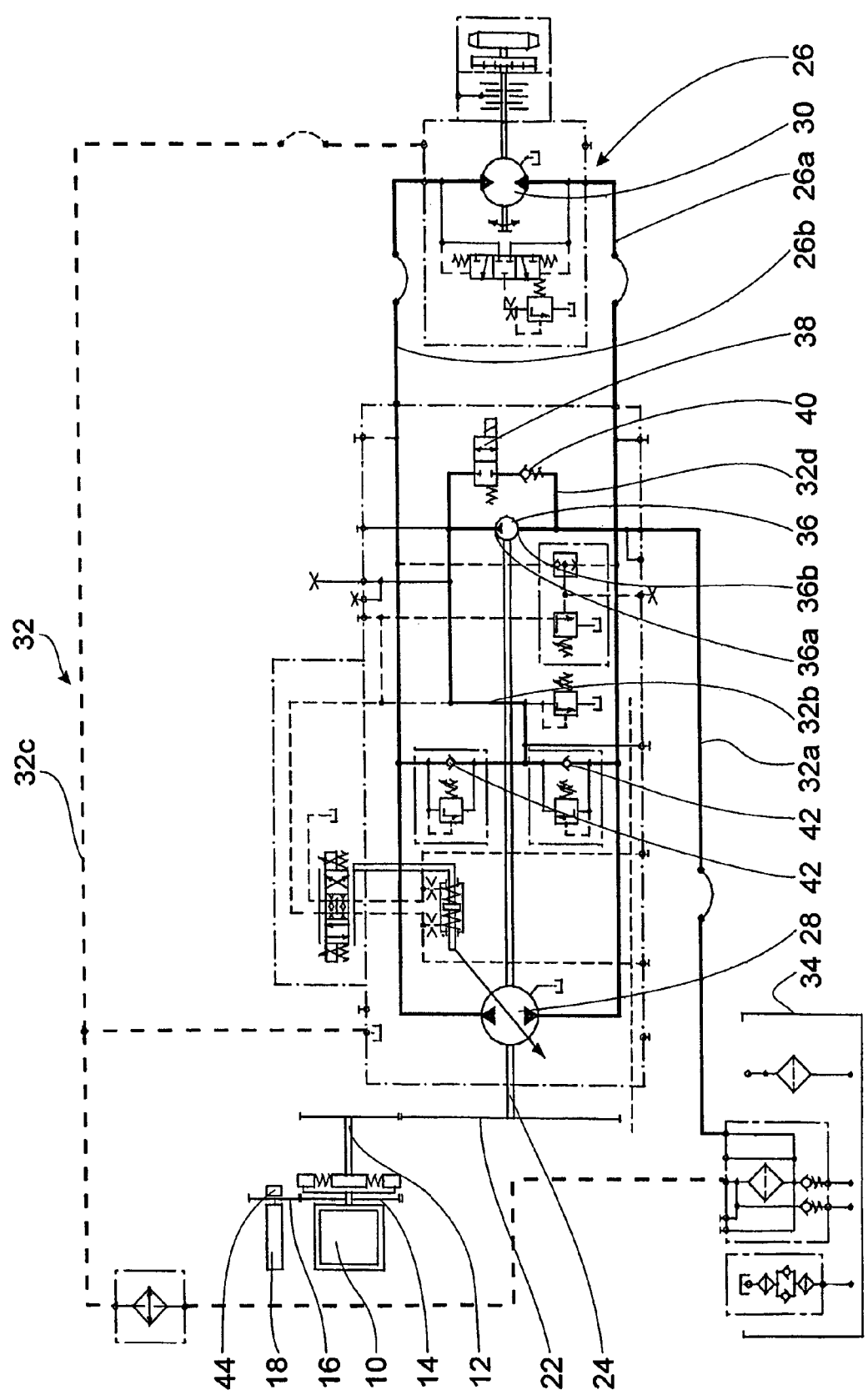
FIG. 1 shows a first embodiment of the drive system according to the invention having a hydrostatic drive circuit.

The drive system shown in FIG. 1 is associated with, in a manner not illustrated in any more detail, a tracked vehicle, in particular for shaping and maintaining pistes and takes on the function of a traction drive of a tracked vehicle. The principal operation of the traction drive corresponds to the embodiment shown in FIG. 2 such that reference is made to the disclosure of the embodiment shown in FIG. 2 in addition for the embodiment shown in FIG. 1. The figure merely shows a single drive side for one of the two track drives. The part of the drive system for the opposite track drive has a correspondingly symmetrical design. The drive system has a drive machine 10 in the form of an internal combustion engine. A gearwheel 14 is provided on the output shaft 12 of said drive machine 10 and engages with a starter pinion 16 of a starter motor 18 during starting of the drive machine 10. The output shaft 12 of the drive machine 10 is also operatively connected to a pump shaft 24 via a distributor gear mechanism 22. In the present embodiment, only one pump shaft 24 is shown. For the opposite drive part of the other track drive, the distributor gear mechanism on the output shaft 12 is designed such that it is connected in a correspondingly symmetrical manner to an opposite pump shaft and to an analogous part of the drive system.

The drive system also has a closed hydraulic circuit 26, which comprises two line sections 26a, 26b, which are each connected to a variable-displacement pump 28 and a hydraulic motor 30. Depending on the desired direction of rotation, in each case one line section 26a, 26b represents the high-pressure line, and the other line section 26b, 26a represents the low-pressure line. The closed circuit 26 is fed with hydraulic fluid via an open circuit 32. The open circuit 32 has a first line section 32a, which leads from a hydraulic fluid tank 34 to a fixed-displacement pump 36 acting as a feed pump for the closed circuit 26, a second line section 32b, which leads from the fixed-displacement pump 36 to the closed circuit 26, and a third line section 32c, which acts as a leakage line and passes the hydraulic fluid, which emerges from the closed circuit 26 in the event of an excess pressure, back to the hydraulic fluid tank 34.

In the region of the fixed-displacement pump 36, a bypass path 32d is provided which connects an output-side pump connection 36a of the fixed-displacement pump 36 to an input-side pump connection 36b of the fixed-displacement pump 36. An electrically switchable solenoid valve 38 and a spring-loaded nonreturn valve 40 are provided in the bypass path, said nonreturn valve 40 only opening in the event of an excess pressure present in the second line section 36b. The electrically switchable solenoid valve 38 is designed such that it is open when a voltage is applied.

Both the variable-displacement pump 28 and the fixed-displacement pump 36 are supplied with mechanical power via the pump shaft 24.

In the closed circuit 26, a pressure of 30 bar to 450 bar is set during operation in the respective high-pressure line, and a pressure of 20 bar to 35 bar is set in the low-pressure line. In the operating state, the solenoid valve 38 is closed, and the bypass line 32d is consequently deactivated. A feed pressure of 20 to 35 bar likewise prevails in the supply line 32b downstream of the fixed-displacement pump 36, and this feed pressure is sufficient for supplying the hydraulic fluid to the closed circuit 26 counter to nonreturn valves 42. A pressure of approximately 1 bar prevails in the section 32a between the hydraulic fluid tank 34 and the fixed-displacement pump 36. The fixed-displacement pump 36 consequently needs to apply a mechanical power during operation which is sufficient to increase the pressure of the hydraulic fluid from 1 bar to approximately 20 to 35 bar.

The power required is so high that there is the risk of the drive machine 10 stalling owing to the high power requirement of the fixed-displacement pump 36 when said drive machine 10 is started. In order to prevent this, the solenoid valve 38 is opened during a starting operation such that the bypass line 32d is activated. As a result, the pressure in the line section 32c of the open circuit 32 falls since the hydraulic fluid, which is at a high pressure there, can flow away into the hydraulic fluid tank 34 via the bypass line 32d and the line section 32a. The spring-loaded nonreturn valve 40 prevents the excess pressure in the line section 32b compared to the line section 32a being completely dissipated. The spring-loaded nonreturn valve 40 ensures that a minimum pressure of 4 to 5 bar is maintained in the line section 32b.

During the starting phase with the solenoid valve 38 open, a pressure of approximately 4 to 5 bar prevails at the pump output and a pressure of only 1 bar prevails at the pump input owing to the open solenoid valve 38. The mechanical power required for operating the fixed-displacement pump 36 is consequently considerably reduced compared with that in the operating state. The power consumption reduced in this manner does not represent a problem for the drive machine 10 when the drive machine 10 is started.

If the drive machine 10 has reached a speed which is above the speed of the starter motor 18, the mechanical operative connection between the starter pinion 16 and the gearwheel 14 is disconnected. This is recognized by a detector 44 provided for this purpose. In response to the mechanical disconnection of the starter motor 18 and the output shaft 12 of the drive machine 10, the solenoid valve 38 is closed via a control device (not illustrated), with the result that the bypass line 32d is interrupted. As a result, the pressure in the section 32c of the open circuit 32 is increased again by the fixed-displacement pump 36, whose power requirement is again increased as a result until the operating feed pressure of 20 to 35 bar is again produced in the section 32c of the open circuit 32. In the course of the rise in this pressure, the power consumption of the fixed-displacement pump 36 also increases until an operating power consumption is reached, and the fixed-displacement pump 36 can assume its function as a feed pump for the closed circuit 26.

The bypass line 32c to the solenoid valve 38 and the nonreturn valve 40 thus makes it possible for the power consumption of the fixed-displacement pump 36 to be reduced during a starting phase to such an extent that reliable run-up of the drive machine 10 is not impeded.

At the same time, the solenoid valve may also be provided for the purpose of reducing the power consumption of the feed pump of the track drive opposite, in a manner which is not illustrated. In this case, the bypass line is designed such that it detects the two feed pumps and thus switching of the solenoid valve at the same time brings about a corresponding reduction in the power consumption of the two feed pumps.

As an alternative, each feed pump has an associated, dedicated bypass line, and in each case one solenoid valve is provided in each bypass line. The two solenoid valves are switched in particular at the same time in analogy to the embodiments described.

Figure 2:
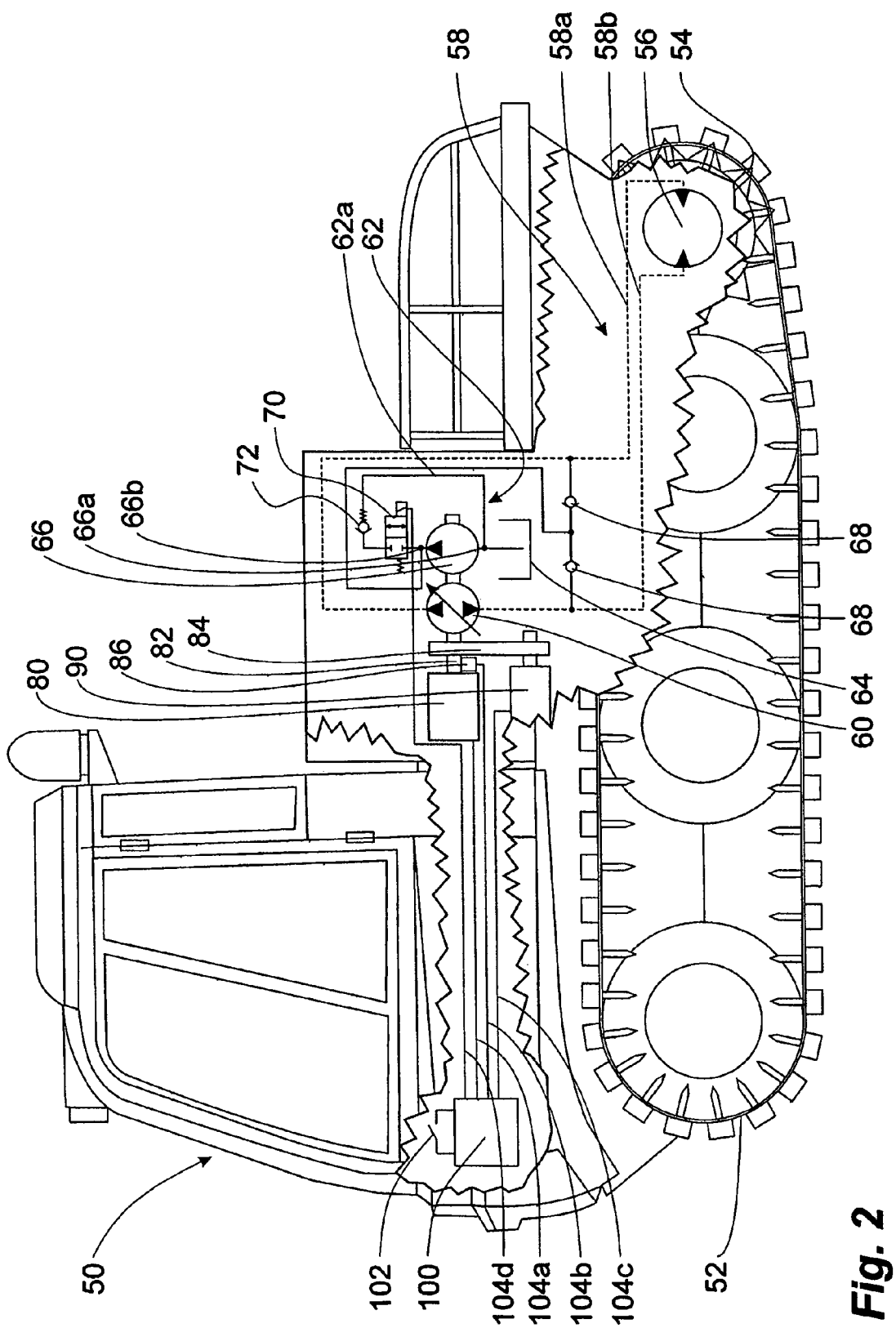
FIG. 2 shows a side view of a tracked vehicle having a second embodiment of the drive system according to the invention.

FIG. 2 shows a second embodiment of a drive system according to the invention. This system likewise serves the purpose of driving a tracked vehicle 50. The left-hand track 52 of the tracked vehicle 50 is driven via an input gearwheel 54, which is in turn driven by a hydraulic motor 56. The hydraulic motor 56 is part of a closed hydraulic circuit 58. The hydraulic components illustrated in FIG. 2 are all associated with the left-hand track 52 of the tracked vehicle 52. Corresponding components are provided for the right-hand track (not illustrated in the drawing), but these corresponding components are not shown. However, the following description applies to the same extent to the respective hydraulic components of the two tracks.

The closed circuit 58 has two line sections 58a, 58b which are connected with in each case one end to a variable-displacement pump 60 and with the respective other end to the hydraulic motor 56. Depending on the conveying direction of the variable-displacement pump 60 and thus depending on the direction of rotation of the hydraulic motor 56, one of the two line sections 58a, 58b represents the high-pressure line, and the respective other represents the low-pressure line of the closed circuit 58.

An open circuit 62 (only partially illustrated in the drawing) is used for maintaining the operating pressure in the closed circuit 58. In this open circuit 62, hydraulic fluid is pumped into the closed circuit 58 from a hydraulic fluid tank 64 by a fixed-displacement pump 66, nonreturn valves 68 preventing hydraulic fluid from emerging from the closed circuit 58 into the open circuit 62 counter to the pumping direction of the fixed-displacement pump 66. A bypass line 62a is provided in the open circuit 62 and connects a pump output 66a of the fixed-displacement pump 66 to a pump input 66b of the fixed-displacement pump 66. An electrically switchable solenoid valve 70 and a spring-loaded nonreturn valve 72 are provided one behind the other in the bypass line, said nonreturn valve 72 opening if there is a sufficient excess pressure on the pump output side compared with the pump input side.

The variable-displacement pump 60 and the fixed-displacement pump 66 are supplied with mechanical power via an output shaft 82 of an internal combustion engine 80. This mechanical coupling cannot be detached.

A generator 90 is likewise coupled to the output shaft 68 of the drive machine 70 via a belt drive 84 such that it cannot be detached mechanically. This generator 90 is a three-phase machine having a field winding and a stator winding. The field winding of the generator 90 can be interrupted by means of a relay (not illustrated).

Furthermore, an electronic control device 100 is provided which is connected to a starting switch 102 arranged in the driver's compartment. The control device 100 is connected to a starter motor of the drive machine 80 via a signal line 104a. In addition, the control device 100 is connected to a frequency sensor 86, which measures the rotation frequency of the output shaft 82 and passes this on to the control device 100 via a signal line 104b.

Furthermore, the control device 100 is connected to the relay for the purpose of disconnecting the field winding of the generator 90 and to the solenoid valve 70 via in each case one signal line 104c, 104d. As a result, the relay of the generator 90 can be opened, on the one hand, by means of a signal voltage from the control device 100, with the result that the field winding is not supplied with current, and, on the other hand, the solenoid valve 70 can be opened such that the bypass line 62a is opened between the pump output 66a and the pump input 66b.

In order to start the drive machine 80, the starting switch 102 is actuated by the driver of the vehicle. As a result, the control device 80 receives a starting pulse. In response to this starting pulse, a voltage is applied to the signal lines 104c, 104d by the control device 80. This has the result that, on the one hand, the field winding in the generator 74 is interrupted by means of the relay and, on the other hand, the valve 70 is opened. Subsequently, a voltage is applied to the signal line 104a by the control device 100, as a result of which starting of the drive machine 80 is brought about by means of a starter motor (not illustrated). Owing to the interruption of the field winding, a countertorque, which acts counter to the drive torque of the drive machine 80, is limited by the generator 90 to frictional losses and the moment of inertia, and is therefore low. Owing to the opening of the valve 70, the hydraulic fluid pressure on the pump output side is reduced to a value, predetermined by the nonreturn valve 84, of approximately 4 to 5 bar. The variable-displacement pump 66 correspondingly merely needs to pump against a pressure difference of approximately 3 to 4 bar. As a result, the countertorque, which acts counter to the drive torque from the fixed-displacement pump 66 on the output shaft 82 of the drive machine 80, is also low.

Once the speed of the output shaft 82 has exceeded a predetermined limit value, the control signal to the control lines 104a, 104c is ended by the control device 100. As a result, firstly the starter motor of the drive machine 80 is deactivated and secondly the field winding of the generator 90 is closed again such that the generator 90 begins to generate current.

Once a time interval, which has been fixedly predetermined in the control device 100, has expired once the control signal on the control lines 104a, 104c has been ended, the control signal on the control line 104d is also ended, as a result of which the solenoid valve 70 is closed such that the bypass line 62a is interrupted and the pressure on the output side of the fixed-displacement pump 66 begins to increase compared with the minimum pressure predetermined by the nonreturn valve 72. If the pressure on the pump output side again corresponds approximately to the operating pressure in the closed circuit 58, the operating state of the tracked vehicle 50 has been reached.

Figure 3:
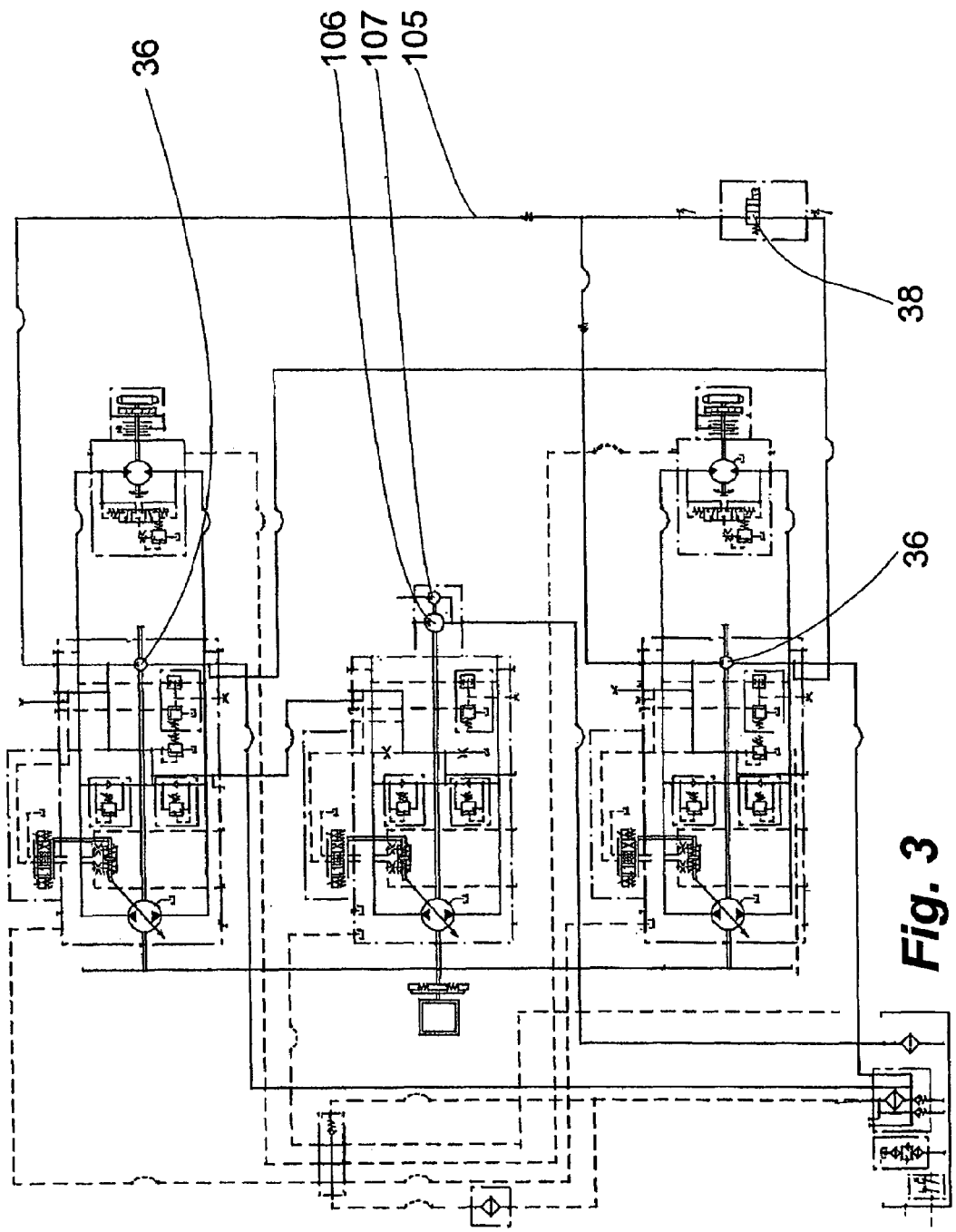
FIG. 3 shows a block diagram of the drive system shown in FIG. 1 for the two track drive sides of the tracked vehicle.

The embodiment shown in FIG. 3 shows a block diagram of a drive system for a tracked vehicle as shown in FIG. 1, in which the drive parts of the two track drive sides are illustrated. This drawing supplements the already explained disclosure relating to the embodiment shown in FIG. 1. Both feed pumps 36 are integrated in a common bypass circuit 105, as shown in FIG. 3, and an individual solenoid valve 38 is associated with this bypass circuit 105. As a result, the two feed pumps 36 can be short-circuited simultaneously in a starting phase of the drive machine, corresponding to the functional variants described in detail above. Furthermore, two further feed pumps 106, 107 are operatively connected to the output shaft of the drive machine. These feed pumps serve the purpose of supplying pressure to further hydraulically operated systems of the tracked vehicle such as a winch drive, a hydraulic fan drive for the drive machine and the working hydraulics of the rear carrier and the front-side attachment. In further exemplary embodiments (not illustrated) of the invention, these feed pumps 106, 107 are likewise integrated in the common bypass circuit 105 or have a dedicated bypass line.

The invention claimed is:

1. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and
wherein the load is a hydraulic pump, the control means is a hydraulic actuating means, it being possible for the load to be short-circuited by means of the hydraulic actuating means, and a bypass line is provided, by means of which the pump output is connected to the pump input, the actuating means associated with the load comprising an electrically actuated solenoid valve, by means of which the bypass line can be controlled.

2. Drive system according to claim 1, further comprising a spring-loaded nonreturn valve in the bypass line, which ensures a minimum pressure on the pump output side.

3. Drive system according to claim 1, wherein the bypass line and the actuating means are integrated in a housing of the hydraulic pump.

4. Drive system according to claim 1, wherein the hydraulic pump is a feed pump, by means of which the operating pressure in a hydrostatic drive circuit of the drive system is maintained.

5. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and
wherein the load is an electric generator, and the control means is designed to suppress the current generation by the generator in the starting phase of the drive machine.

6. Drive system according to claim 5, wherein the production of an exciter field in the generator can be suppressed by the control means by interrupting a field winding of the generator.

7. Drive system according to claim 5, wherein the control means is designed to suppress the electrical connection between the generator and a vehicle power supply system or a battery of the vehicle.

8. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and
wherein the control means comprises a time-delay means, which delays a control effect, which is intended to be brought about by a control signal, of the control means temporally with respect to a reception of the control signal.

9. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and
further comprising at least two loads each having at least one control means, the control means being designed such that a control effect, which is coupled to the reception of a control signal, is brought about at a different time interval from the reception of the control signal.

10. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and
wherein the control means is connected directly to a starter of the vehicle and is designed such that it brings about a control effect for the duration for which a starter current is applied.

11. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and further comprising a starter motor, which is operatively connected to the output drive of the drive machine in a mechanically detachable manner, and a sensor for the purpose of determining the coupling state of the starter motor and the output drive, a control line being provided between the sensor and the control means.

12. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and wherein the control means is connected to a speed sensor coupled to the output drive of the drive machine and is designed such that a control effect is brought about as a function of a determined speed.

13. Drive system for a tracked vehicle, having a drive machine and at least one load, which is mechanically coupled to an output drive of the drive machine, wherein at least one control means is associated with the at least one load and reduces a power consumption of the at least one load in a starting phase of the drive machine temporarily compared with a power consumption in an operating state of the load whilst maintaining the mechanical coupling, and wherein the control means is connected to an electronic control device which controls the control means as a function of driving parameters, parameters of the hydraulic drive system and/or environmental parameters.

* * * * *